United States Patent [19]

Taylor

[11] Patent Number: 4,570,685

[45] Date of Patent: Feb. 18, 1986

[54] VACUUM TUBE ENGINE OIL SAMPLER

[76] Inventor: Julian S. Taylor, 8300 SW. 8, Oklahoma City, Okla. 73128

[21] Appl. No.: 747,624

[22] Filed: Jun. 24, 1985

Related U.S. Application Data

[63] Continuation-in-part of Ser. No. 636,787, Aug. 1, 1984, Pat. No. 4,524,811, which is a continuation-in-part of Ser. No. 438,240, Nov. 1, 1982, abandoned.

[51] Int. Cl.⁴ .............................................. B65D 51/16
[52] U.S. Cl. .................................. 141/61; 73/864.52; 184/1.5
[58] Field of Search ..................... 73/864.52; 141/7, 8, 141/61, 65, 330; 184/1.5; 604/88, 148, 201, 414, 905

[56] References Cited

U.S. PATENT DOCUMENTS

| | | | |
|---|---|---|---|
| 2,840,123 | 6/1958 | Metcalfe | 141/7 X |
| 3,795,246 | 3/1974 | Sturgeon | 604/99 X |
| 3,797,491 | 3/1974 | Hurschman | 604/201 X |
| 4,063,460 | 12/1977 | Svensson | 141/8 X |
| 4,191,225 | 3/1980 | Ogle | 604/414 X |
| 4,499,930 | 2/1985 | Walters | 141/8 |

Primary Examiner—Stephen Marcus
Assistant Examiner—Mark Thronson
Attorney, Agent, or Firm—Robert K. Rhea

[57] ABSTRACT

An engine or gearbox oil sampling device for use with an engine or gearbox containing lubricating oil. The device includes a hand held container having a flexible tube communicating with its interior. The free end of the tube is provided with a hollow member adapted for entering an engine or crankcase oil access opening. Prior to accessing oil the pressure within the container is reduced below atmospheric pressure by connecting the flexible tube with a vacuum pump through a vacuum pump head which supports a flexible and resilient stopper for sealing the end of the tube opposite the container fluid tight after reducing the pressure therein. The stopper includes a frangible wall ruptured by the hollow tubular member as it enters the oil access opening.

9 Claims, 3 Drawing Figures

U.S. Patent   Feb. 18, 1986   4,570,685
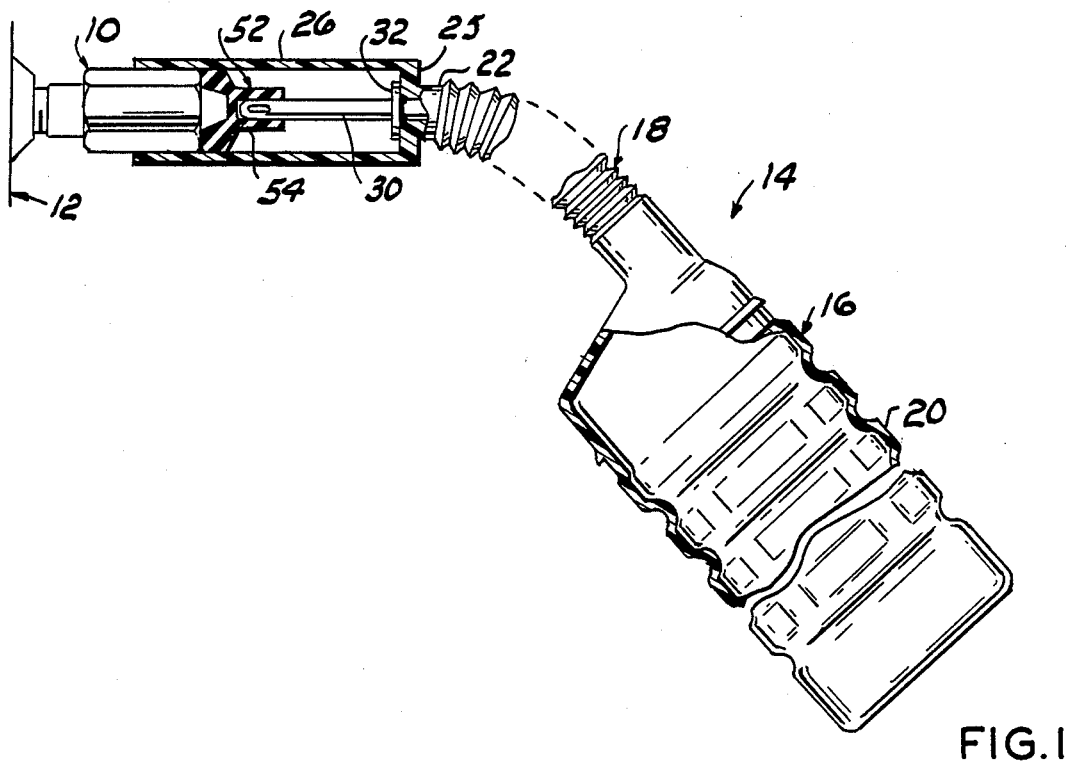
FIG. 1
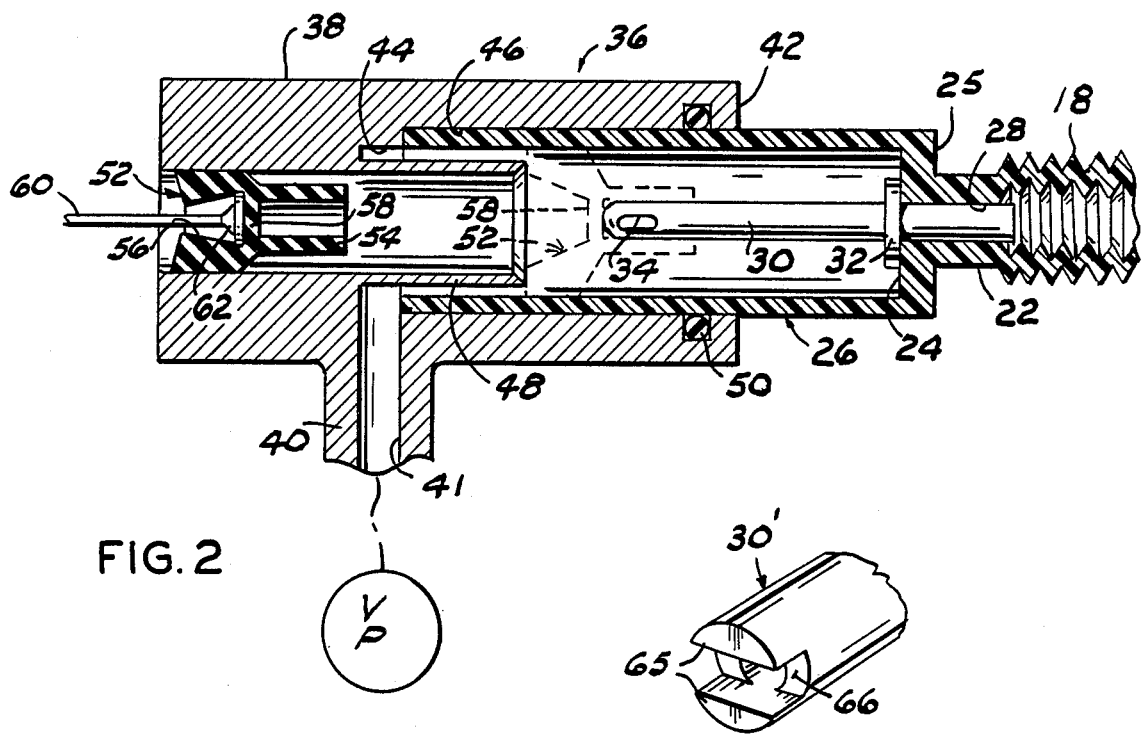
FIG. 2
FIG. 3

VACUUM TUBE ENGINE OIL SAMPLER

This application is a continuation-in-part of an application filed by me in the U.S. Patent and Trademark Office for ENGINE OIL SAMPLING DEVICE on Aug. 1, 1984, Ser. No. 06/636,787, now U.S. Pat. No. 4,524,811, which is a continuation-in-part of Ser. No. 438,240, filed Nov. 1, 1982, now abandoned.

BACKGROUND OF THE INVENTION

1. Field of the Invention.

The present invention relates to an internal combustion engine, gearbox, or oil conducting line and more particularly to a device for obtaining a sample of the lubricating oil when there is little or no oil pressure in a gearbox below the oil level therein or in an engine where there is little or no pressure at the desired sampling point, such as below the oil level in the crankcase.

In the maintenance of internal combustion engines, such as, but not limited to, over-the-road tractors, gearboxes, railway locomotives, and the like, it is common practice to obtain a sample of the engine lubricating oil or gearbox oil for analysis. By analyzing the various elements in suspension in the oil, a determination is made of the condition of the engine moving parts and when it is necessary that the engine or gearbox undergo an overhaul.

This type of analysis may be termed preventive maintenance in that upon learning the oil condition will reveal the condition of the engine or gearbox components, the engine or gearbox may be serviced while near a service area rather than resulting in a break-down while operating away from a point of maintenance or service.

2. Description of the Prior Art.

In obtaining samples of engine or gearbox lubricating oil it has been common practice to insert a tube into the engine crankcase area or gearbox sump through the dip stick access opening or access plug while the equipment is idle. The inserted tube is connected with a pressure reducing bulb or apparatus for drawing a quantity of the engine lubricant out of the crankcase or gearbox which is received by a suitable receptacle. This procedure has the disadvantage of contaminating the crankcase or gearbox oil sample by other impurities not normally present in the crankcase or gearbox oil, such as are found on the interior of the dip stick access opening or access opening allowing dirt to enter a gear case. Further, the sample device is frequently used for successively containing a plurality of engine oil or crankcase samples thereby transferring some of the impurities from one oil sample to another by the sampling device. Additionally, such a sample obtaining apparatus is not usually capable of being sealed, as a separate unit, while awaiting its turn for the analyzing function.

This invention is distinctive over the present procedure by providing an oil sample obtaining device which is relatively inexpensive and therefore may be discarded after a one time use, one of the devices being used for each engine oil or crankcase oil sample obtained. Further, the device operates in combination with an access plug installed on the engine crankcase or one of its oil conducting lines below the oil level and is capable of being sealed fluid tight after obtaining an oil sample.

SUMMARY OF THE INVENTION

A generally cylindrical container is provided at one of its ends with an elongated flexible tube. The end of the flexible tube opposite the container is axially connected with a hollow tubular member having an opening at its end or in its wall adjacent its end opposite the container. The end portion of the flexible tube opposite the container is diametrically enlarged and projects diametrically and longitudinally beyond the tubular member to form a sleeve-like shield therearound. The shield is removably received by a T-shaped vacuum head connected with a vacuum pump for reducing the pressure in the container and its flexible tube. A frangible stopper, slidably carried by the vacuum head, sealingly envelopes the open end portion of the tubular member and remains within the sleeve to maintain the container partial vacuum when the sleeve is separated from the vacuum head. To obtain an oil sample, the sleeve slidably surrounds a self-sealing access plug connected with an engine access or gearbox sump containing lubricating oil. Simultaneously, the stopper seals with the adjacent end of the access plug and is ruptured by the tubular member for entering the bore of the access plug and permitting the container to draw in engine or gearbox oil in dissipating its partial vacuum.

The principal object of this invention is to provide an internal combustion engine lubricating oil or gearbox oil sampling device formed by a sealed container containing less than atmospheric pressure in which a closed tubular member, connected with the container, is opened when the tubular member is placed in communication with oil contained by an engine or gearbox permitting oil to flow from the engine or gearbox into the container.

BRIEF DESCRIPTION OF THE DRAWINGS

FIG. 1 is a side elevational view, partially in longitudinal section, illustrating the device in operative position;

FIG. 2 is a cross sectional view of a vacuum head connected with a vacuum pump and the container connected flexible tube illustrating the manner of reducing pressure within and sealing the container; and, FIG. 3 is a fragmentary perspective view of another embodiment of the access plug entering tubular member.

DESCRIPTION OF THE PREFERRED EMBODIMENTS

Like characters of reference designate like parts in those figures of the drawings in which they occur.

In the drawings:

The reference numeral 10 indicates an access plug connected with an oil lubricating line crankcase or gearbox 12 of an internal combustion engine or gear case. The access plug 10 is described in my U.S. Pat. No. 3,794,289 and is marketed under the Trademark GAUGE PLUG. Briefly stated, the plug comprises a cylindrical member threadedly connected at one end with the crankcase 12. The plug is centrally bored for communication with the interior of the crankcase or other vessel and for receiving a relatively small diameter tubular probe communicating at its inner end with lubricating oil contained by the crankcase or gear case. The plug bore is provided with sealing means which close the bore when the plug is not in use and seal fluid tight with the periphery of an inserted probe. The above access plug description forms no part of this invention other than to set forth the combination with which the present invention is used.

The reference numeral 14 indicates the sampling device which is generally cylindrical comprising a preferably plastic container 16 integrally connected, as by blow molding, to an elongated flexible tube 18. The wall 20 of the container preferably is provided with dimples or annular indentations to strengthen its relatively thin wall and prevent the collapse thereof for the reasons presently explained. Similarly, the wall of the tube 18 is formed in substantially accordion fashion to permit ease in bending and prevent its collapse in response to a pressure deferential across the tube wall.

The end portion of the tube wall opposite the container is diametrically reduced and thickened, as at 22, and then radially expanded to define a forwardly facing shoulder 24 and a rearwardly facing shoulder 25 with the wall being axially extended opposite the container to define a sleeve portion 26 of selected length and inner and outer diameters, both greater than the tube wall end portion 22. The bore 28 of the tube end wall portion 22 axially receives one end portion of a relatively small elongated tubular member 30 having an annular flange 32 intermediate its ends flatly contacting the shoulder 24. The thickened tube portion 22 and shoulder 25 form a gripping area for manually manipulating the sleeve 26 and tubular member 30 in a forward thrusting action, as presently explained. The other end of the needle-like tubular member 30 is closed in the preferred embodiment (FIG. 2) and provided with an opening 34 in its wall adjacent its closed end. The sleeve 26 loosely surrounds the tubular member 30 and projects a selected distance therebeyond.

A vacuum head means 36 comprises a centrally bored body portion 38, having a lateral branch 40 centrally bored, as at 41 for communicating with the bore of the body 38, is operatively connected with a vacuum pump VP. The tee-shaped body 38 is step diameter counterbored from its end 42, as at 44 and 46, to communicate with the branch bore 41. The bore 44 defines a short inner tube wall portion 48 projecting toward the body end 42 beyond the innersection with the branch 40. The large counterbore 46 closely receives slidably the outside surface of the major portion of the container tube sleeve 26 with the bore of the sleeve in communication with the branch bore 41.

An O-ring 50, nested in the inner wall of the body 38, surrounds the periphery of the sleeve. The axial bore of the body 38 contains a flexible and resilient material stopper means 52 characterized by a cylindrical socket forming end portion 54 open toward the tubular member 30 and dimensioned to receive its wall opening end portion in sealing relation. The other end portion of the stopper means 52 is diametrically enlarged to define an outside diameter at least slightly greater than the inside diameter of the sleeve 26 and is axially bored, as at 56, from its end opposite the socket 54, to define a relatively thin frangible wall 58 between the socket 54 and bore 56. The bore 56 removably receives a push rod 60 having a flanged head normally gripped peripherally by the stopper bore 56 wall.

The tubular member 30' (FIG. 3) may alternatively be provided with a bifurcated end forming opposing parallel legs 65 defining a lateral wall opening 66 for the tubular member when the legs are in contact with an object.

Operation

In operation, the flexible tube sleeve 26 is inserted into the vacuum head counterbore 46. The stopper means 52 is normally in place, as shown by solid lines (FIG. 2) in which the small diameter of the body bore has inwardly compressed the expanding wall portion of the stopper to maintain the stopper in place. The vacuum pump is operated to reduce the pressure within the vacuum head sleeve 26, flexible tube 18 and container 16. When the desired pressure reduction in the container has been reached, the push rod 60 is manually forced toward the tubular member 30 to the dotted line position of FIG. 2 wherein the diametrically enlarged end portion of the stopper means 52 seals with the inner wall surface of the sleeve 26 while its socket 54 forms a primary seal of the wall opening end portion of the tubular member 30, thus maintaining the partial vacuum within the container 16. The vacuum pump is stopped and the sleeve 26 removed from the vacuum head.

When it is desired to sample engine or gearbox oil, assuming oil is present at the inner end limit of the access plug 10, the open end of the sleeve 26 is manually slid over the outwardly projecting end portion of the crankcase or gearbox connected access plug 10. As the sleeve is manually further moved toward the crankcase, the stopper means 52 engages and seals with the end of the sleeve surrounded access plug. The tubular member 30 is forced in a manual forward axial thrusting action, by gripping the tube portion 22, through the frangible wall 58 and into the access plug wherein the partial vacuum in the container draws engine oil, not shown, into the container. Obviously, the tubular member 30 may be secured to the flexible tube 18 by other means as desired in order to permit manual insertion of the member 30 into the oil access opening.

Obviously the invention is susceptible to changes or alterations without defeating its practicability. Therefore, I do not wish to be confined to the preferred embodiment shown in the drawings and described herein.

I claim:

1. In an engine or gearbox containing a quantity of lubricating oil and having a centrally bored access plug connected with a wall of the engine or gearbox in communication with the oil, the improvement comprising:
   a flexible tube
   an oil sample receiving container connected with one end of the flexible tube;
   a hollow member axially connected with and projecting beyond the other end of the flexible tube in communication with the interior of the container,
      said hollow member having an elongated tubular portion adapted at its end opposite said tube for entering the bore of the access plug and admitting oil to the container,
      said tubular portion having a wall,
      said tubular portion having an opening in its wall adjacent its said opposite end;
   means for reducing the pressure in said container to less than atmospheric pressure; and,
   frangible stopper means normally sealing the wall opening in said wall of said tubular portion for maintaining the reduced pressure in said container.

2. The combination according to claim 1 in which the pressure reducing means includes:
   sleeve means including a sleeve connected at one end with said tube and loosely surrounding said tubular portion opposite end and tightly surrounding said stopper means for forming a container reduced pressure secondary seal.

3. The combination according to claim 2 in which said pressure reducing means includes:
   a vacuum pump; and,
   vacuum head means having bores therein for providing communication between the vacuum pump and the interior of said container.

4. The combination according to claim 3 in which one of the vacuum head means bores sealingly receives the end portion of said sleeve opposite said tube and in which another of the vacuum means bores slidably supports said stopper means.

5. A system for obtaining an oil sample from an engine crankcase, gearbox or oil conducting line having an opening in its wall, comprising:
   an oil sample receiving container;
   an elongated flexible tube connected at one end with said container;
   a hollow member axially connected with the other end of said tube,
      said hollow member having an elongated tubular portion adapted at its end opposite said tube for entering the opening in the crankcase, gearbox, or oil conducting line wall and admitting oil to the container,
      said tubular portion having a wall,
      said tubular portion having an opening in its wall adjacent its said opposite end;
   means for reducing the pressure in said container to less than atmospheric pressure; and,
   frangible stopper means normally forming a primary seal around the wall opening in said tubular portion for maintaining the reduced pressure in said container.

6. The system according to claim 5 in which the pressure reducing means includes:
   a sleeve connected at one end with said tube and loosely surrounding said tubular portion opposite end and tightly surrounding said stopper means for forming a secondary hollow tubular member seal.

7. The system according to claim 6 in which said pressure reducing means includes:
   a vacuum pump; and,
   vacuum head means having bores therein for providing communication between the vacuum pump and the interior of said container.

8. The system according to claim 7 in which one of the vacuum head means bores sealingly receives the end portion of said sleeve opposite said tube and in which another of the vacuum means bores slidably supports said stopper means.

9. The system according to claim 5 and further including:
   means joining said hollow member with said flexible tube for preventing axial movement of said hollow member relative to said flexible tube.

* * * * *